April 27, 1954  M. W. BOWERSOX  2,676,598

APPARATUS FOR WASHING DISHES AND THE LIKE

Filed Nov. 17, 1952

INVENTOR.
Marvin W. Bowersox.
BY
Fishburn & Mullendore
ATTORNEYS.

Patented Apr. 27, 1954

2,676,598

UNITED STATES PATENT OFFICE 2,676,598

APPARATUS FOR WASHING DISHES AND THE LIKE

Marvin W. Bowersox, Elk City, Kans.

Application November 17, 1952, Serial No. 320,903

7 Claims. (Cl. 134—56)

This invention relates to apparatus for washing dishes and the like, and more particularly to such an apparatus that soaks the dishes in a washing solution during the washing process.

Various dishwashing apparatus and/or machines are known in which dishes and other utensils to be washed are placed on a rack or stand arranged in a container and then washed by jets or sprays of water directed on them. Motor driven impellers, pumps and the like, controls, timers and the like are usually part of the equipment in present day so-called automatic dishwashing machines and the like. Such equipment results in relatively expensive machines and also necessitates the machines being of such size that they are impractical in small kitchens such as found in many apartments.

The present invention is directed to a dishwashing apparatus in which dishes to be washed are arranged in a closed container and a quantity of relatively hot water directed in jets onto the dishes to fill the container to a predetermined level which is above the dishes, the dishes then being allowed to soak in the water until the temperature thereof lowers to a predetermined temperature at which time a portion of the water is drained from the upper part of the container, then all the water is drained from the container and more hot water directed in jets onto the dishes to remove loosened particles and then rinse the dishes.

The objects of the invention are to provide dishwashing apparatus that is economical to manufacture, relatively small, compact and efficient in operation with no power required other than the water pressure normally present in domestic water systems; to provide such a dishwashing apparatus wherein the dishes are immersed and soaked in a quantity of washing liquid and grease, food particles and the like rising to the upper portion of the liquid are separately drained from the container to prevent redeposit of such grease and food particles on the dishes as the washing liquid is drained from the container; and to provide a simple, efficient dishwashing apparatus having a minimum of parts that is easy to maintain.

In accomplishing these and other objects of the present invention, I have provided improved details of structure the preferred forms of which are illustrated in the accompanying drawings, wherein.

Figure 1:
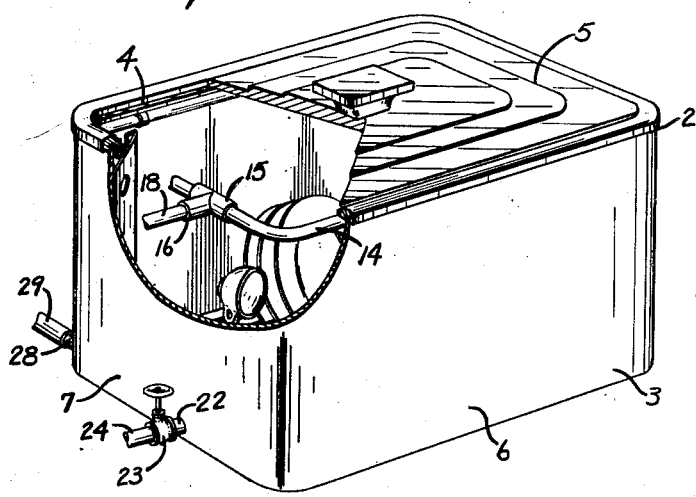
Fig. 1 is a perspective view of the dishwashing apparatus with portions broken away to illustrate the interior thereof.
Figure 3:
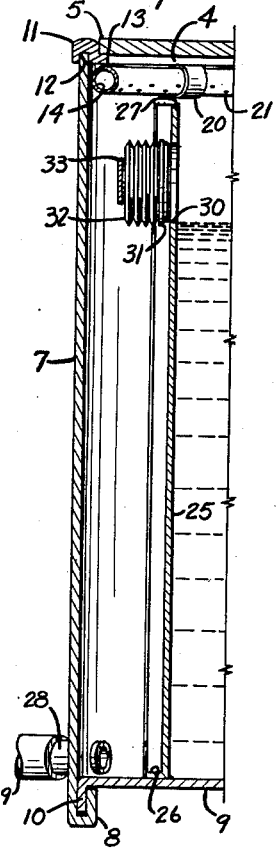
Fig. 3 is a vertical sectional view through the overflow duct and grease drain.
Figure 2:
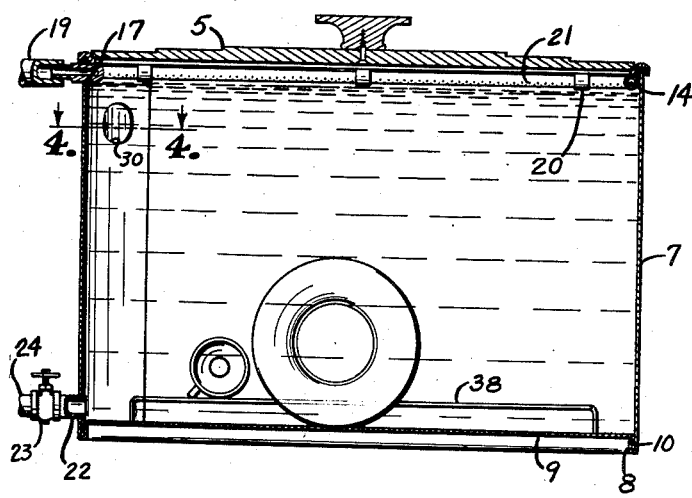
Fig. 2 is a longitudinal sectional view through the dishwashing apparatus.
Figure 4:
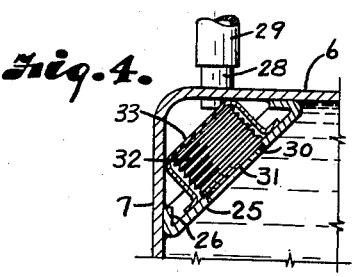
Fig. 4 is a transverse sectional view through the heat responsive drain valve.

Referring more in detail to the drawings:

1 designates a dishwashing apparatus which includes a container 2 of suitable size to hold a quantity of dishes to be washed. The container consists of a receptacle 3 having an open top 4 closed by a cover 5. The receptacle has vertically arranged side and end walls 6 and 7 respectively, preferably formed of a single sheet of metal with the lower edges turned upwardly as at 8. A bottom 9 has a downwardly turned peripheral flange 10 which is crimped and suitably sealed between the side and end walls and the upwardly turned lower edges thereof to make a watertight joint. In the form of the invention illustrated the walls and bottom are of single thickness of metal, but it is obvious said walls may be insulated if desired.

A rim or molding 11 is preferably arranged around the upper edge of the side and end walls 6 and 7, said upper edges extending into a groove 12 in said molding. The molding is provided with an inwardly extending flange 13 spaced below the upper edge of the molding and adapted to be engaged by the peripheral edge of the cover 5 to support said cover. A tube 14 extends around the inside of the receptacle above the normal water level therein and preferably immediately under the flange 13. The tube is preferably in the form of a loop with the ends connected to a T fitting 15, a branch 16 of which extends outwardly through an opening 17 in an end wall of the receptacle, said branch having a pipe 18 connected thereto and adapted to receive one end of a hose 19, the other end of which is adapted to be connected to a hot water faucet of a domestic hot water system. The tube 14 is preferably supported by a plurality of hangers 20 which extend around the tube and have portions extending upwardly over the upper edge of the side and end walls 6 and 7 respectively under the molding 11. The tubing 14 preferably has a plurality of spaced apertures 21 arranged to direct a plurality of jets of water downwardly and inwardly in the receptacle.

A drain fitting 22, having a valve 23 therein, extends through a wall of the receptacle adjacent the bottom 9, whereby opening of the valve 23 will drain substantially all of the water from the receptacle. The drain fitting is preferably provided with a hose or pipe 24 to facilitate emptying the water into a kitchen sink or other disposal. A partition 25 is preferably arranged adjacent one corner of the receptacle and is provided with flanges 26 suitably secured as by welding to the bottom 9 and the adjacent side and end walls of the receptacle. The partition 25 extends vertically in the receptacle and terminates as at 27 adjacent to but below the tube 14, whereby said upper edge and space between the partition and the adjacent walls form an overflow passage for the receptacle, the overflow water passing through a pipe 28 which extends through the receptacle wall in communication with the space between the partition 25 and the adjacent side and end walls. The pipe 28 is preferably connected to a hose 29 which conducts the overflow water to a sink or other disposal.

The maximum filled level of water in the receptacle is determined by the upper edge 27 of the partition whereby the level of said water is below the tube 14 so there is no possibility of the washing liquid entering the tube and being drawn back into the domestic water system. The partition 25 has an opening 30 adjacent to but spaced below the upper edge 27 thereof, whereby the lower edge of the opening 30 is above any dishes or the like positioned in the receptacle. A valve 31 operated by a suitable temperature responsive member 32 is arranged in the overflow passage and adapted to seat on the edges of the opening 30 to close same when the liquid in the receptacle is above a predetermined temperature, the temperature responsive member 32 operating to move the valve 31 to open the opening 30 when the liquid is below said predetermined temperature. In the structure illustrated the valve 31 is mounted on a bellows, the other end of which is supported by a U-shaped bracket 33, the ends of which are secured to the partition 25 on opposite sides of the opening 30.

In operating a dishwashing apparatus constructed as described, dishes to be washed are placed in the receptacle on a suitable rack 38 and a suitable detergent introduced into the receptacle. The cover 5 is then placed on the receptacle to close same. The hoses 24 and 29 are then arranged to empty to any suitable disposal and the valve 23 is closed. The hose 19 is then connected to a suitable source of hot water which is actuated whereby hot water under pressure is flowed into the tube 14 and discharged through the openings 21 in a plurality of jets that are directed onto the dishes. The flow of hot water is continued, gradually raising the level of the washing liquid in the container, the temperature of the water being such that the temperature responsive member 32 moves the valve 31 to close the opening 30. When the washing liquid level in the container rises to the upper edge 27 of the partition 25 the liquid flows over the partition into the overflow and is discharged through the drain 28 and hose 29. As the liquid begins to overflow the upper edge of the partition 25 the hot water is turned off and the dishes allowed to soak in the hot water and detergent to further soften and loosen any particles of food that have not been removed by the jets of water issuing from the openings 21. Some particles of food, grease and the like will rise to the surface of the washing liquid and as the liquid cools below a temperature at which the temperature responsive member 32 is set to actuate, said temperature responsive member moves the valve 31 to open the opening 30 to drain the upper portion of the washing liquid, together with grease and any food particles therein, from the receptacle for discharge through the drain pipe 28 and tube 29. Then, or at a later time as desired, the valve 23 is opened to drain all of the washing liquid from the receptacle. Then the hot water is turned on and discharged through the openings 21 in a plurality of jets directed onto the dishes to remove any softened particles of food still adhering thereto and also thoroughly rinse the washing liquid therefrom. The hot water heats the dishes and then after a suitable rinse the hot water is turned off and the heat remaining in the dishes tends to dry the same and the dishes are then ready to be removed from the container.

It is believed obvious that I have provided a dishwashing apparatus that is economical to manufacture, relatively small in size, efficient in operation and having few parts requiring adjustment or maintenance.

What I claim and desire to secure by Letters Patent is:

1. Dishwashing apparatus comprising, a container for dishes to be washed, spray means in the container and adapted for connection to a source of hot water to direct jets of hot water on the dishes in the container, an overflow connection having an inlet communicating with the interior of the casing adjacent the upper portion of said container, an outlet from the container between the overflow inlet and the normal upper level of the dishes in the container, a temperature responsive means closing said outlet when the washing liquid is above a predetermined temperature and opening said outlet for draining off the upper portion of the washing liquid when the washing liquid is below said predetermined temperature, and a valved drain fitting communicating with the container at the bottom thereof for draining substantially all of the washing liquid therefrom.

2. Dishwashing apparatus comprising, a container for dishes to be washed, spray means in the upper portion of the container above the normal upper level of dishes therein and adapted for connection to a source of hot water to direct jets of hot water downwardly on the dishes in the container, an overflow connection having an inlet communicating with the interior of the container adjacent to and below the spray means, an outlet from the container between the overflow inlet and the normal upper level of the dishes in the container, a temperature responsive means closing said outlet when the washing liquid is above a predetermined temperature and opening said outlet for draining off the upper portion of the washing liquid when the washing liquid is below said predetermined temperature, and a valved drain fitting communicating with the container at the bottom thereof for draining substantially all of the washing liquid therefrom.

3. Dishwashing apparatus comprising, a container for dishes to be washed, a tubular member extending around the interior of the container, said tubular member being adapted for connection to a source of hot water and having a plurality of spaced apertures therein to direct jets of hot water on the dishes to selectively fill the container and to rinse the dishes after washing liquid is drained from the container, an overflow connection having an inlet communicating with the interior of the container adjacent the upper portion thereof, an outlet from the container between the overflow inlet and the normal upper level of dishes in the container, a temperature responsive means closing said outlet when the washing liquid is above a predetermined temperature and opening said outlet for draining off the upper portion of the washing liquid when the washing liquid is below said predetermined temperature, and means communicating with the container and selectively operable for draining substantially all the washing liquid therefrom.

4. Dishwashing apparatus comprising, a container for dishes to be washed, a tubular member in the upper portion of the container above the normal level of dishes therein, said tubular member being adapted for connection to a source of hot water and having a plurality of spaced apertures therein to direct jets of hot water downwardly on the dishes to selectively fill the container and to rinse the dishes after washing liquid is drained from the container, an overflow connection having an inlet communicating with the interior of the container adjacent to and below the tubular member, an outlet from the container between the overflow inlet and the normal upper level of dishes in the container, a temperature responsive means closing said outlet when the washing liquid is above a predetermined temperature and opening said outlet for draining off the upper portion of the washing liquid when the washing liquid is below said predetermined temperature, and a valve drain fitting communicating with the container at the bottom thereof for draining substantially all the washing liquid therefrom.

5. Dishwashing apparatus comprising, a receptacle having bottom, side and end walls and an open top for containing dishes to be washed, a cover for closing the open top of the receptacle, spray means in the upper portion of the receptacle, said spray means being adapted for connection to a source of hot water to direct jets of hot water on the dishes to selectively fill the receptacle and to rinse the dishes after washing liquid is drained from the receptacle, a partition extending upwardly in the receptacle and having side and bottom edges sealingly secured to the bottom and adjacent walls of the receptacle, said partition terminating at its upper end adjacent to the upper portion of the receptacle to form an overflow for washing liquid in the receptacle, said partition and adjacent walls of the receptacle defining an overflow passage, an open drain communicating with the overflow passage adjacent the lower end thereof, said partition having an opening providing communication between the overflow passage and the remainder of the receptacle between the upper end of the partition and the normal upper level of dishes in the container, a temperature responsive means closing said opening when the washing liquid is above a predetermined temperature and opening said opening for draining off the upper portion of the washing liquid when the washing liquid is below the said predetermined temperature, and means communicating with the receptacle and selectively operable for draining substantially all of the washing liquid therefrom.

6. Dishwashing apparatus comprising, a receptacle having bottom, side and end walls and an open top for containing dishes to be washed, a cover for closing the open top of the receptacle, a rim on the upper edges of the side and end walls of the receptacle and having an inwardly extending flange for supporting the cover, spray means in the upper portion of the receptacle above the upper level of dishes therein and below the flange on the rim, said spray means being adapted for connection to a source of hot water and having a plurality of spaced apertures therein to direct jets of hot water downwardly on the dishes to selectively fill the receptacle and to rinse the dishes after washing liquid is drained from the receptacle, a partition extending upwardly in the receptacle and having side and bottom edges sealingly secured to the bottom and adjacent walls of the receptacle, said partition terminating at its upper end adjacent to and below the spray means to form an overflow for washing liquid in the receptacle, said partition and adjacent walls of the receptacle defining an overflow passage, an open drain communicating with the overflow passage adjacent the lower end thereof, said partition having an opening providing communication between the overflow passage and the remainder of the receptacle between the upper end of the partition and the normal upper level of dishes in the container, a temperature responsive means closing said opening when the washing liquid is above a predetermined temperature and opening said opening for draining off the upper portion of the washing liquid when the washing liquid is below the said predetermined temperature, and means communicating with the receptacle and selectively operable for draining substantially all of the washing liquid therefrom.

7. Dishwashing apparatus comprising, a receptacle having bottom, side and end walls and an open top for containing dishes to be washed, a cover for closing the open top of the receptacle, a rim on the upper edges of the side and end walls of the receptacle and having an inwardly extending flange for supporting the cover, a tubular member in the upper portion of the receptacle above the upper level of dishes therein and below the flange on the rim, said tubular member being adapted for connection to a source of hot water and having a plurality of spaced apertures therein to direct jets of hot water downwardly on the dishes to selectively fill the receptacle and to rinse the dishes after washing liquid is drained from the receptacle, a partition extending upwardly in the receptacle and having side and bottom edges sealingly secured to the bottom and adjacent walls of the receptacle, said partition terminating at its upper end adjacent to and below the tubular member to form an overflow for washing liquid in the receptacle said partition and adjacent walls of the receptacle defining an overflow passage, an open drain communicating with the overflow passage adjacent the lower end thereof, said partition having an opening providing communication between the overflow passage and the remainder of the receptacle between the upper end of the partition and the normal upper level of dishes in the container, a valve for controlling flow of liquid through the opening in the partition, a temperature responsive means actuating said valve to close said opening when the washing liquid is above a predetermined temperature and opening said opening for draining off the upper portion of the washing liquid when the washing liquid is below the said predetermined temperature, and a valved drain fitting communicating with the receptacle at the bottom thereof for draining substantially all of the washing liquid therefrom.

References Cited in the file of this patent

UNITED STATES PATENTS

| Number | Name | Date |
|---|---|---|
| 111,176 | Churchman | Jan. 24, 1871 |